United States Patent [19]

Romaine et al.

[11] Patent Number: 5,291,685
[45] Date of Patent: Mar. 8, 1994

[54] INTACT SEED-BASED DELAYED-RELEASED NUTRIENT SUPPLEMENT FOR MUSHROOM CULTIVATION

[75] Inventors: C. Peter Romaine, State College, Pa.; Alan Marlowe, Ocean Side, Calif.

[73] Assignee: The Penn State Research Foundation, University Park, Pa.

[21] Appl. No.: 943,669

[22] Filed: Sep. 11, 1992

[51] Int. Cl.⁵ .......................... A01G 1/04; C05F 11/00
[52] U.S. Cl. ................................................ 47/1.1; 71/5
[58] Field of Search ................ 71/5; 47/1.1, 1.102, 47/1.103, 1.104, 1.107

[56] References Cited

U.S. PATENT DOCUMENTS

| | | | |
|---|---|---|---|
| 3,942,969 | 3/1976 | Carroll et al. | 71/5 |
| 4,370,159 | 1/1983 | Holtz | 71/5 |
| 4,534,781 | 8/1985 | Wu et al. | 71/5 |
| 4,617,047 | 10/1986 | Bretzloff | 71/5 |
| 4,646,466 | 3/1987 | Olah | 47/1.1 |
| 4,803,800 | 2/1989 | Romaine et al. | 47/1.1 |

OTHER PUBLICATIONS

Murphy et al. (1989) Biochem. J. 258:285-293.
L. C. Schisler, Appl. Ag. Res., vol. 5, No. 1, pp. 44-47 (1990).

Primary Examiner—David T. Fox
Assistant Examiner—Bruce R. Campell
Attorney, Agent, or Firm—Thomas J. Monahan

[57] ABSTRACT

Intact seed of rapeseed is added to compost at spawning to increase the yield of mushrooms similar to chemical-based delayed-release supplements. No chemicals, however, are needed in its preparation, only a treatment to destroy sprouting of the seed.

17 Claims, 4 Drawing Sheets

INTACT SEED-BASED DELAYED-RELEASED NUTRIENT SUPPLEMENT FOR MUSHROOM CULTIVATION

TECHNICAL FIELD

The present invention relates generally to the field of mushroom cultivation and more particularly to an environmentally-compatible, intact seed-based, delayed-released nutrient supplement for mushrooms, a process for making same, and a process for utilizing the same in the cultivation of mushrooms.

BACKGROUND OF THE INVENTION

Fungi are microscopic, spore-bearing organisms that lack chlorophyll and therefore derive nourishment from dead or living organic matter [Alexopoulos, C. J., et al., *Introductory Mycology* (1979), Chapter 1]. Because they share characteristics of both plants and animals, they are classified separately in the Kingdom Myceteae. Within this Kingdom, there are the "filamentous fungi," so named because their vegetative bodies consist of small filaments referred to as "hyphae." Typically, the hyphae grow in a branching fashion, spreading over or within the substrate used as the source of nourishment, thereby forming a network of hyphae called "mycelium." In the life cycle of most filamentous fungi, the mycelium gives rise to either asexual or sexual reproductive bodies bearing spores. The spore is functionally comparable to the seed of higher plants, being important in the dispersal and survival of the fungus in nature. Under suitable environmental conditions, the spore germinates to form another generation of hyphae and so completing the life cycle of the fungus.

Perhaps filamentous fungi are best known for their edible, fleshy, sporebearing, reproductive structures called "mushrooms." Mushrooms have been grown commercially for many years. Throughout these years, commercial production of cultivated mushrooms has increased dramatically. In 1939, worldwide production of *Agaricus bisporus* (also referred to as *Agaricus brunnescens*), the most popular of the edible cultivated mushrooms, was 46,000 tons. By 1982, such production was in excess of 850,000 tons [Flegg, P. B. and Wood, D. A., *The Biology and Technology of the Cultivated Mushroom*, Chapter 1, p. 7 (1985)].

The common edible mushroom (e.g., *A. bisporus*) has both vegetative and reproductive ("fruiting") forms. The form most familiar to consumers is the fruiting form (i.e., mushroom), which has a stalk and an umbrella shaped cap. The life cycle of this mushroom fungus begins with the germination of a spore, which produces hyphae. A collection of hyphae compact together and form the mycelium. The mycelium then grows and invades the environment as networks. Small masses at the periphery of the network of mycelium enlarge and differentiate to form immature mushrooms called "buttons." The buttons rapidly enlarge and burst through the soil and become mature mushrooms. Mushrooms are produced from mycelium in cycles referred to as "breaks" or "flushes." A single population of mycelium may produce multiple breaks. The mushrooms then produce spores which germinate and produce further mycelium.

Methods of commercial mushroom cultivation are well known and generally involve inoculating beds or trays of compost with mushroom spawn. Such compost is rich in nutrients and capable of supporting the mushroom fruiting stage. As used herein, the term "spawn" refers to a nutrient substrate, typically rye or millet, colonized by mycelium. In the process referred to as "spawning," the spawn is mixed with compost to promote growth of the mycelium throughout the compost. The compost is usually comprised of straw-bedded horse manure or other combinations of fibrous plant material. Several weeks after spawn dissemination, when the compost has been sufficiently colonized by the fungus, the compost is covered with a thin layer of "casing soil" (e.g., peat, soil). This process is called "casing." Within weeks of casing, mushrooms develop and are harvested in breaks. U.S. Pat. No. 4,803,800 is related to same.

Owing to its stimulatory effect on the yield of mushrooms, the addition of protein-rich, lipid-rich supplements (generally soybean meal) to the compost has become a widespread practice in the commercial cultivation of the button mushroom *A. bisporus*. Typically, supplements are added at the time when the compost is inoculated with the mushroom fungus (SASing, supplementation of spawning). Supplements may also be mixed with the compost at casing (SACing, supplementation at casing). In yet another variation on the time of supplementing, supplements can be added during the mushroom production cycle [Schisler, L. C. 1990. *Applied Agricultural Research*, 5:44–47].

A salient feature of commercial supplements is that the availability of nutrients is delayed until the mushroom fungus has thoroughly invaded the compost, thereby minimizing early utilization by competitive microorganisms within the compost. The state-of-the-art mechanism of delayed-release involves formaldehyde-denaturation of the protein (Spawn Mate Co.) and encasing the protein in a water-repellent film containing the fungicide Mertect (Thiabendazole) (Campbell Soup Co.). [These techniques are disclosed in U.S. Pat. Nos. 3,942,969; 4,370,159; 4,534,781; and 4,617,047]. However, because these materials contain chemical pesticides, their future in the mushroom industry is tenuous. Formaldehyde has been restricted by the Environmental Protection Agency and California now requires the routine monitoring of workers handling Spawn Mate for exposure to formaldehyde. Campbell Soup's supplement was banned in Canada, although its use is now permitted. Considering the emerging trend towards the reduced usage of chemicals in agriculture, there is an urgent need to develop an environmentally-safe, delayed-release supplement for mushrooms. The present invention overcomes the above-described disadvantages inherent with various compositions and methods of the art. The invention presents compositions, methods for their preparation and use, which permit safe, economical, and convenient application in the commercial production of mushrooms.

SUMMARY OF THE INVENTION

The invention is based upon the unexpected observation that certain plant seeds (i.e., rapeseed), having been treated to cause loss of the ability to germinate, are capable of functioning as delayed-released nutrient supplements for use in commercial mushroom cultivation. In accordance with the present invention based upon this observation, intact seed, preferably rapeseed, is treated to prevent sprouting and thereafter used as a mushroom nutrient supplement. Preferably, the seed is heated, (i.e., 195° F. for 24 hours) to destroy germination capability. The resulting product is a non-composted intact seed-based naturally-occurring delayed-released nutrient supplement that is suitable for use in commercial mushroom production. The invention differs significantly from prior practices that used chemicals to delay the release of nutrients.

The invention may be practiced by adding the treated seed to the compost at spawning thereby increasing the yield of mushrooms in a manner similar to the prior art chemical-based delayed-release supplements. With the formulations of the invention, however, no chemicals are required in its preparation. In the preferred practice, only a heat treatment is used to discourage sprouting of the seed. Although the reasons for the success of this invention herein described are not fully known and should not be limited by theory, it is believed that a highly impervious seed coat resists microbial attack. The treatment of seed compositions of the invention to remove or inhibit their ability to germinate may or may not be lethal to the plant seed. It is also expected that large-scale manufacturing using seed-based nutrient supplements of the invention would be more economical than prior art supplements. Compositions of the invention are environmentally safe and are inherently less biohazardous to manufacture and utilize than existing commercial supplements.

OBJECTS OF THE INVENTION

It is therefore an objective of this invention to provide an environmentally-compliant delayed-release nutrient supplement for use in mushroom cultivation.

A further object of this invention is to provide an economical seed-based nutrient supplement for increasing the yield of commercial mushroom production.

Advantages of the present invention over the prior art and a better understanding of the invention and its use will become more apparent from the following disclosure in conjunction with the accompanying drawings wherein are set fully by way of illustration and example, certain embodiments of the invention.

DETAILED DESCRIPTION

The invention is preferably practiced by treating essentially intact whole seed (commonly referred to as "grain") of rapeseed obtained from any suitable source such that the capability of seed sprouting is essentially removed. In general, intact seed is viewed as substantially free of damage other than that normally associated with harvesting and post-harvest handling and distribution. In a preferred embodiment of the invention, the rapeseed was canola obtained from Wilbur Ellis Company, Southwest Feed Division, Los Angeles, Calif. Canola is the name given to a group of rapeseed (*Brassica napus* and *Brassica campestris*) varieties that have been bred to contain low levels of erucic acid and glucosinolates. "Canola" is an acronym for CANADA OIL LOW ACID. It is a trademark name owned by the Canola Council of Canada. Only varieties of rapeseed that are low in these compounds are designated double zero ("00"). So canola are "00" varieties of rapeseed, with all canola being rapeseed, however, not all rapeseed being canola. Canola is used as a source of oil for human consumption and for canola meal used as an animal or poultry feed. In contrast, the oil of other varieties of rapeseed, which are high in erucic acid and glucosinolates, find applications as industrial lubricants. The Proceedings of the International Canola Conference, Apr. 2–6, 1990 at Atlanta, Ga. contain a discussion of Canola in the paper *Canola A World Class Crop*, by S. E. Younts. The details of that paper are incorporated herein by reference thereto.

It is believed that the present invention will work not only with canola varieties, but also with varieties of rapeseed that are high or low in erucic acid and high or low in glucosinolates. It is also believed that varieties of canola and/or rapeseed or mixtures thereof grown commercially at this time will work with this invention. It is also believed that other plant species within the same family as rapeseed (mustard family) as well of other families or mixtures thereof, particularly, plants recognized as being oil seed species, might be utilized. Related and unrelated plant species are listed later. Many of these are oilseed and animal feed species.

In a preferred embodiment, intact rapeseed is heated prior to use to destroy, inhibit, prevent or otherwise retard sprouting capability. Sufficient loss of seed sprouting capability is usually achieved at 195° F. (90.5° C.) for 24 hours in a drying oven or autoclaving at 252° F. (121° C.) for 1.5 hours. The time and temperature parameters are interrelated and can be combined or varied, but treatment is required that results in the complete, or nearly so, inhibition of sprouting or achieves death of the embryo and otherwise retains the structural integrity of the seeds. Although the minimum time and temperature that is needed to effect this desired physiological result is variable, 195° F. (90.5° C.) for 24 hours or 252° F. (121° C.) for 1.5 hours is effective. Variable time/temperature regimes may be required. Selection of same must consider the quantity of seed being treated since larger bulks of seed may require more extreme conditions to effectively destroy sprouting capability. The invention may be broadly practiced by other physical or chemical treatments to discourage sprouting including, but not limited to: gamma irradiation, UV irradiation, microwaving (induction heating), ultrasound, micronizing and anti-sprouting chemical agents. Alternatively, genetically-sterile seeds could be used. It is believed that if rapeseed is allowed to sprout, then it is a less effective supplement, presumably due to utilization of the nutrient reserve by the developing plant, rather than the mushroom fungus.

The mechanism of how the seed compositions of the invention achieve the objective of delayed-release of nutrients is not precisely known. The physical and/or physiological properties of the seed coat may impede the availability of the internal nutrient reserve to microorganisms external to the seed. One possibility is that the seed is impervious to water. Therefore, the delayed-release mechanism might be enhanced further through coating rapeseed with hydrophobic or hydrophilic substances that slow hydration of the seed. In any case, the seed should be essentially intact because heat-treated seed, which is then crushed, as well as overheated seed, and which presumably has lost integrity of the seed coat, have been found to lose the delayed-release property, as measured by the excessive evolution of heat in the compost during the spawn growth phase. Thus, seed that has been subjected to treatment, physical, chemical, or otherwise, and yet fails to promote an excessive overheating of the compost during spawn growth, can be considered "intact."

Once the seed is properly conditioned to function as a nutrient supplement, the procedure for best implementing the supplement is the same as the other methods known in the art, namely, dispersing the supplement in growing media for commercial mushrooms. The various media appropriate for a particular fungus are known in the art including compost, straw, and wood or wood products (i.e., sawdust, wood chips, etc.). For *A. bisporus*, the supplement would be disseminated in compost, for Pleurotus spp in straw, and for *Lentinula edodes* in sawdust. The rate of application of the supplements of the invention would be similar to existing commercial supplements, in the range of approximately 2-25% on a dry weight basis of the compost. Optimization of the rate of application can be routinely determined by practitioners and certain variation may occur.

For *A. bisporus* and other commercial mushrooms, the treated rapeseed or other composition of the invention can be introduced into the compost at the time of spawning (SASing), at casing (SACing) or during the mushroom production phase of the cropping cycle.

The invention is preferably practiced by using heat processing in the treatment of the intact seeds. Such heat processing would consist of surrounding the seed with dry air in an electric forced-air convection oven or by micronizing, which is a dry heat from microwaves emitted from an infrared burner. Alternatively, a roasting technique could be used wherein the seed is heated to the desired temperature in a suitable oven for the proper period of time. The mechanism of roasting appears to increase the nutritive value of animal-feed species. It is also possible to utilize a new technology of batch and continuous blending and drying using equipment, for example, available from Patterson and Kelly Company wherein batch blenders are used to heat kill the seed. Autoclaving the seed (at 252° F. (121° C.) for about 1.5 hours) in a steam sterilizer may also be used.

The present invention can be adapted for use with many species, varieties, and strains of edible fungi including but not limited to:

| | |
|---|---|
| Agaricus spp. | Calvatia gigantea |
| Auricularia spp. | Flammulina velutipes |
| Boletus spp. | Morchella spp. |
| Cantharellus spp. | Philota namelco |
| Lentinula edodes | Stropharia rugoso-annluata |
| Panoeolus venenosus | Volvariela volvacea |
| Pleurotus spp. | |
| Tremeila fuciformis | |

Other oilseed species and animal-feed species might achieve the same effect as described here for rapeseed including but not limited to:

| | |
|---|---|
| Arachis spp. | Brassica adpressa |
| B. campestris | B. chinensis |
| B. carinata | B. fruitculosa |
| B. hirta | B. integrifolia |
| B. juncea | B. napus |
| B. nigra | B. oleracea |
| B. tournefortii | Calendulm officinalis |
| Camelina sativa | Carthamus spp. |
| Centranthus macrosiphon | Ceratotheca sesamoides |
| Crambe spp. | Crepis alpina |
| Cuphea spp. | Dimorphotheca plurialis |
| Diplotaxis erocoides | Elaeis spp. |
| Eruca sativa | Euphorbia spp. |
| Glycine spp. | Gossypium spp. |
| Guizotia spp. | Helianthus spp. |
| Impatiens balsamina | Lesguerella fendler |
| Limnanthes alba | Linum spp. |
| Medicago sativum | Papaver spp. |
| Olea european | Ricinus spp. |
| Raphanus sativus | Simmondsia spp. |
| Sesamum spp. | S. avernsis |
| Sinapis alba | |
| Zea mays | |

EXPERIMENTAL

In the following examples, the present invention was evaluated for its effect on the production of mushrooms compared to the state-of-the-art commercial delayed-release supplements. Although these experiments utilize off-white hybrid varieties of *A. bisporus*, the compositions and methods of the invention can be used to cultivate other varieties of *A. bisporus* as well as diverse mushroom species. The following examples also illustrate the usefulness of the invention under both pilot plant and commercial-scale growing conditions. These examples are offered to illustrate particular embodiments of the invention, but are not intended to be limitative thereof.

EXAMPLE 1

In this example, the intact rapeseed supplement was dispersed in the compost at the time of spawning. This production trial was conducted at the pilot plant facility of The Pennsylvania State University known as the Mushroom Research Center. For each treatment, each of six 4 ft.$^2$ trays containing 50 lbs. fresh weight of compost were spawned with 110 grams of a commercial off-white hybrid strain of *A. bisporus*. In treatment 1, the compost was unsupplemented. In treatment 2, the compost in each tray was mixed with 1 lb. (7% based on the dry weight of compost) of the commercial supplement Spawn Mate II SE. In treatment 3, 0.5 lbs. (3.5% based on the dry weight of compost) of the commercial supplement Fast Break was mixed into the compost of each tray. In treatments 4 and 5, the compost in each tray was amended with 1 lb. (7% based on the dry weight of compost) and 2 lbs. (14% based on the dry weight of compost) of heated rapeseed supplement, respectively.

After a 13 day spawn growth period at approximately 25° C., the trays were cased with 1.5 inch thick layer of a mixture of peat and limestone and maintained at 25° C. during case hold and 18° C. during cropping.

It should be noted that in this experiment, the rapeseed was heated insufficiently to only 142° F. (60° C.) for 12 hours, so extensive sprouting of the seed occurred during the spawn growth and mushroom production phases of this crop. Aside from resulting in an unsightly appearance of rapeseed sprouts throughout the growing medium, we speculate that the developing seedling utilized much of the nutrient reserve within the seed such that the full stimulatory effect of the rapeseed supplement on the yield of mushrooms was not realized. As shown in Table 1 below, after six weeks (42 days) of production, the yield of mushrooms from compost amended with Spawn Mate II SE, Fast Break, and rapeseed at 2 lbs. per tray were statistically comparable and significantly higher than the yield obtained from unsupplemented compost. No stimulatory effect on yield was obtained with 1 lb. rate of rapeseed. This was probably related to loss of the nutrients associated with sprouting as discussed above.

TABLE I

| Treatment | Yield after Six Breaks (lbs./ft.$^2$)* |
|---|---|
| Unsupplemented | 2.98 b |
| Spawn Mate II SE (7%) | 4.00 a |
| Fast Break (3.5%) | 4.05 a |
| Rapeseed (7%) | 3.15 b |
| Rapeseed (14%) | 3.81 a |

Source of the supplements:
Spawn Mate II SE (Spawn Mate, 1500 41st. Ave., Capitola, CA)
Fast Break (Penford Products Co. of Cedar Rapids, IA)
Rapeseed (Canola, Wilbur Ellis Co., Southwest Feed Division, Los Angeles, CA)
*Numbers followed by the same letter are not significantly different by the Waller-Duncan K-ratio t test, P = 0.05

EXAMPLE 2

The objective of this experiment was identical to Example 1. However, here the rapeseed was treated at 195° F. (90.5° C.) for 24 hours in an electric, forced-air convection oven to more effectively destroy germination capability.

The cropping parameters were similar to Example 1, the Mushroom Research Center was used, six trays per treatment, each containing 50 lbs. fresh weight of compost, each spawned with 110 grams of a commercial off-white hybrid strain of A. bisporus. The supplements were mixed into the compost at the time of spawning. A 13 day spawn growth period at 25° C. was used. One difference between this example and Example 1 was that at the time of casing, shredded colonized compost was mixed into the casing material at the rate of 1 lb. per 10 ft.$^2$ of production bed before it was overlaid to the depth of 1.5 inches on each tray.

Figure 1:
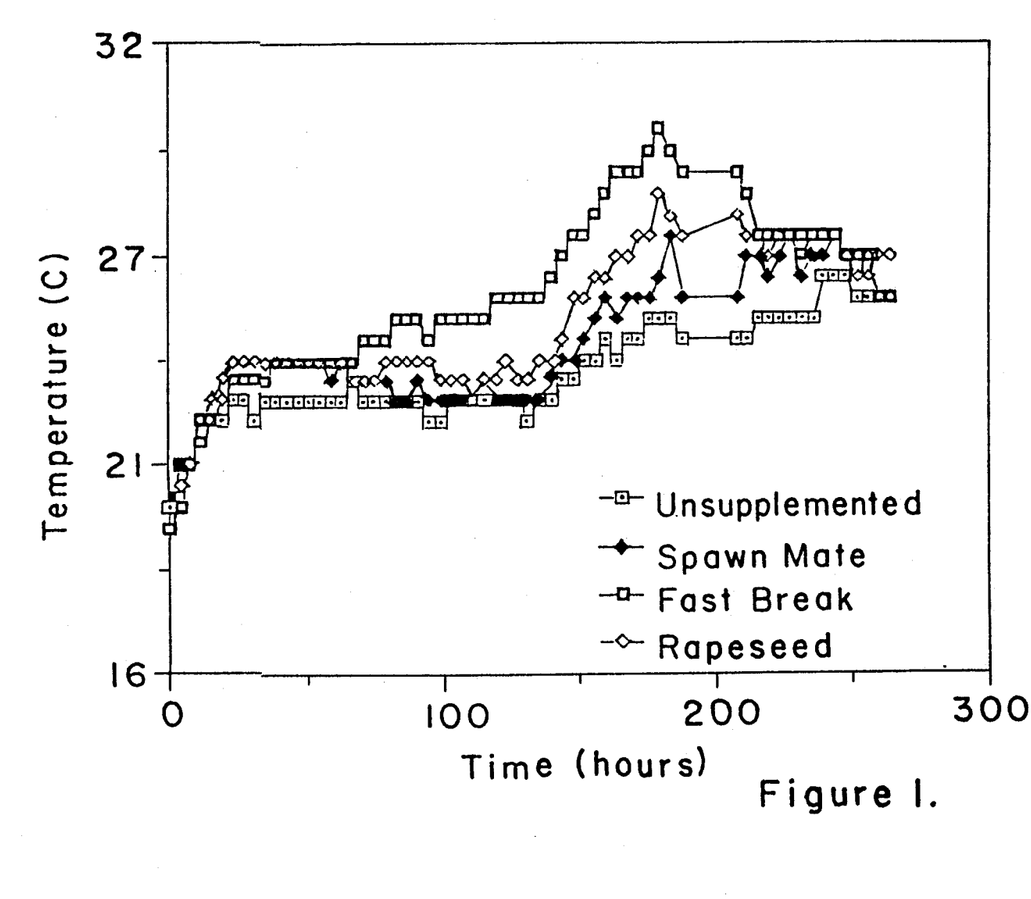
FIGS. 1 and 4 are line graphs comparing the temperature profiles in the compost during spawn run for various forms of supplements.

For each treatment, the temperature of the compost was recorded every four hours over the 13 day spawn growth phase. This was done to determine if the nutrients in the rapeseed were released too rapidly causing an excessive heating of the compost from high biological activity (i.e., other microorganisms utilizing the nutrients for their growth). This is an important consideration because excessive heating during the spawn growing period can directly affect the mushroom fungus and reduce the yield of mushrooms. As appears in FIG. 1, the temperature profiles of the compost that had been amended with rapeseed and the commercial delayed-release supplements, Spawn Mate II SE and Fast Break were similar in form and magnitude. Therefore, the delayed-release mechanism achieved with intact rapeseed closely paralleled that of commercial supplements consisting of chemically-treated processed seed by-products.

Figure 2:
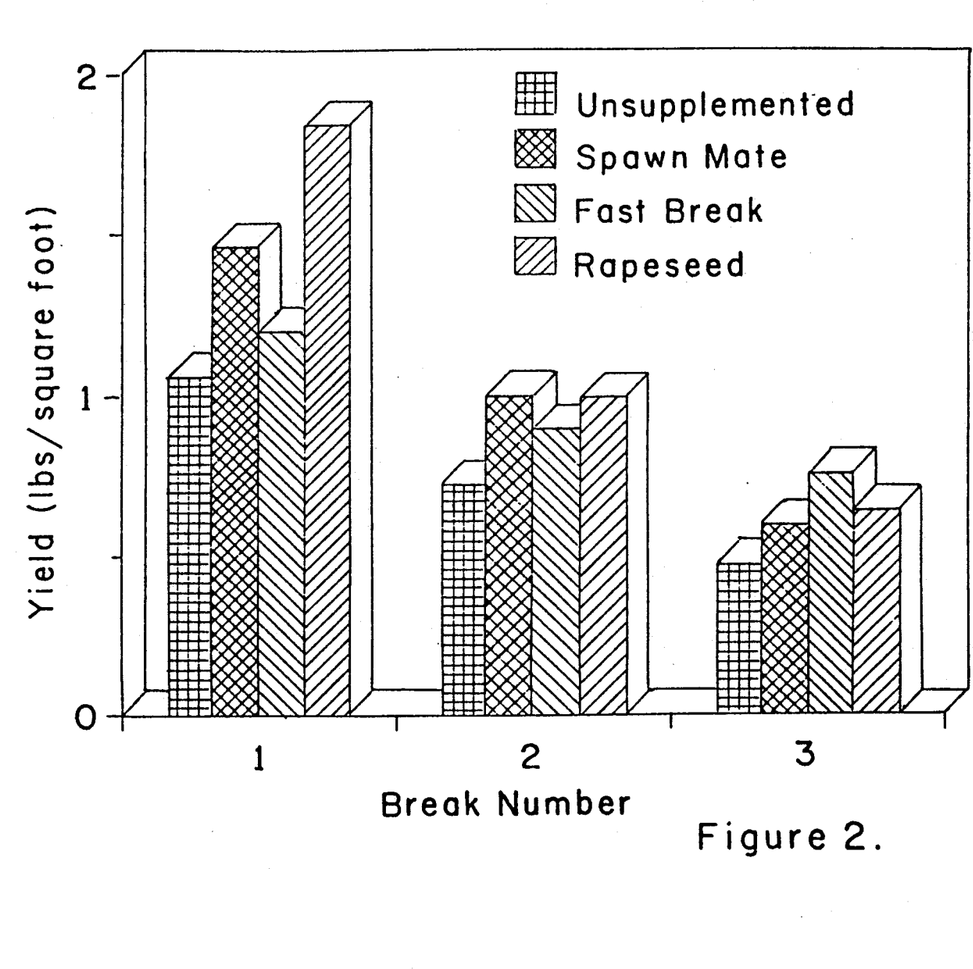
FIGS. 2 and 3 are bar graphs comparing the yield for various supplements.

After four weeks (28 days) of production, the highest yield (3.58 lbs./ft.$^2$) was obtained with rapeseed supplement at 1 lb. per tray (7% dry weight basis of the compost) (Table II.). In this trial, yield with rapeseed supplement was statistically greater than with the commercial supplements Spawn Mate II SE at 1 lb. per tray (7% dry weight basis of the compost) and Fast Break at 0.5 lbs. per tray (3.5% dry weight basis). All supplements provided a significant increase in yield of mushrooms compared with the unamended compost treatment. FIG. 2 shows the yield of mushrooms at each break for the first three breaks. Addition of rapeseed to the compost at spawning increased yield at each of the first three breaks of mushrooms in a fashion similar to the commercially-available delayed release supplements Spawn Mate II SE and Fast Break.

Occasional sprouts of rapeseed were observed in the compost and throughout the casing layer, but the level was well within an acceptable range.

TABLE II

| Treatment | Yield after Four Breaks (lbs./ft.$^2$)* |
|---|---|
| Unsupplemented | 2.32 c |
| Spawn Mate II SE (7%) | 3.12 b |
| Fast Break (3.5%) | 3.07 b |
| Rapeseed (7%) | 3.58 a |

Source of supplements: Same as Table I
*Number followed by the same letter are not significantly different by the Waller-Duncan K-ratio t test, P = 0.05

EXAMPLE 3

This is another side-by-side test comparing the rapeseed supplement and commercial delayed-release supplements added to the compost at the time of spawning. The cropping trial was conducted at the Mushroom Research Center. Each treatment had 6 trays each containing 50 lbs. of compost, each spawned with 110 grams of a commercial off-white hybrid strain of A. bisporus. All other conditions for cropping were as described in example 2. The rapeseed was treated as in Example 2 to prevent germination capability.

Figure 3:
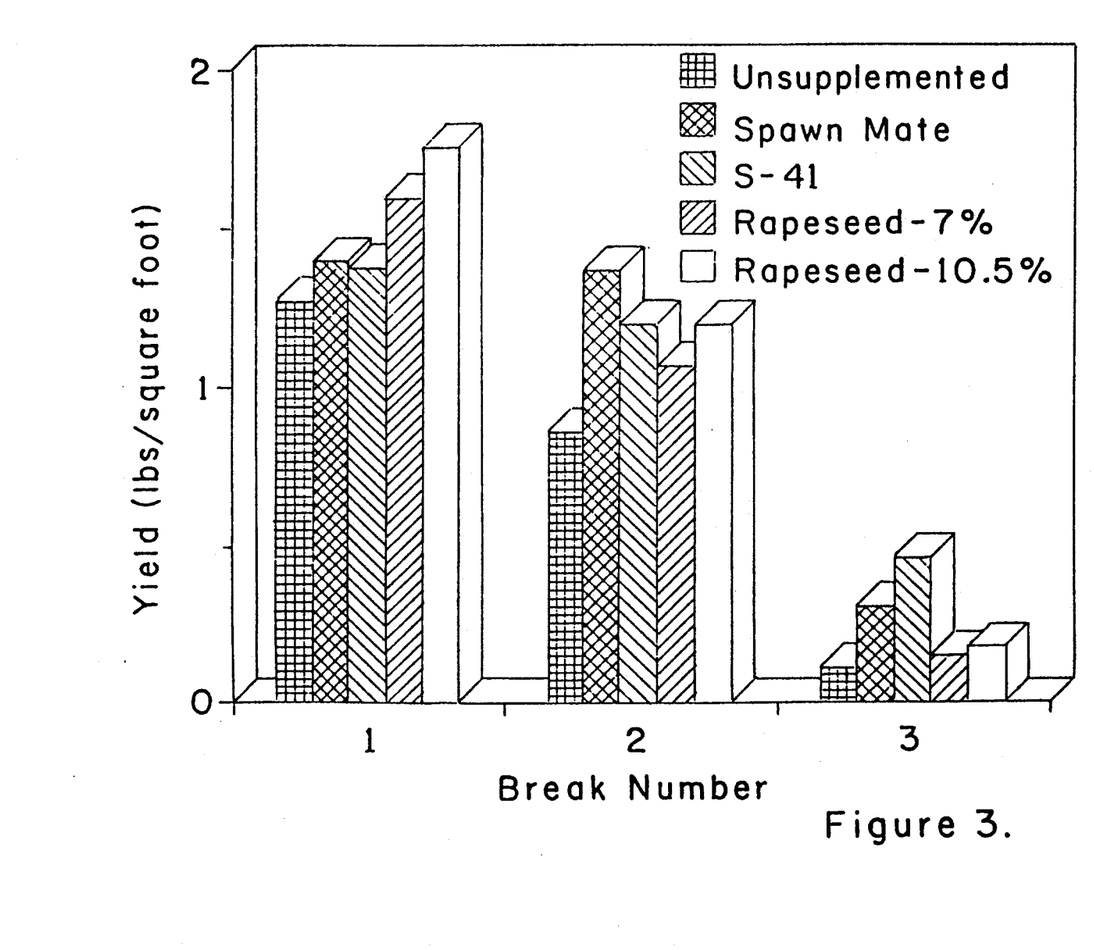

Table III reveals that after 4 breaks (28 days), the yield of mushrooms was comparable from compost amended at spawning with the commercial supplements Spawn Mate II SE at 1 lb. per tray (7% dry weight basis of the compost), S-41 at 0.75 lbs. per tray (5% dry weight basis of the compost), and rapeseed supplement at 1.5 lbs. per tray (10.5% dry weight basis of the compost). At the lower rate of rapeseed of 1 lb. per tray (7% dry weight basis of the compost), production of mushrooms was comparable to S-41 but lower than Spawn Mate II SE and rapeseed at the higher rate. All supplements, irrespective of their rate, increased the yield of mushrooms compared to the unamended compost control treatment. FIG. 3 depicts the yield of mushrooms at each break for the first three breaks of the cropping cycle. Rapeseed and the commercial delayed-release supplements increased yield of mushrooms at each break, however, rapeseed provided the greatest stimulatory effect during the first and second breaks.

TABLE III

| Treatment | Yield after Four Breaks (lbs./ft.$^2$)* |
|---|---|
| Unsupplemented | 2.35 c |
| Spawn Mate II SE (7%) | 3.32 a |
| S-41 (5%) | 3.12 ab |
| Rapeseed (7%) | 2.84 b |
| Rapeseed (10.5%) | 3.29 a |

Source of supplements:
Spawn Mate II SE and Rapeseed (Same as Table I)
S-41 (Campbell Fresh, Inc., P.O. Box 169, Blandon, PA)
*Numbers followed by the same letter are not significantly different by the Waller-Duncan K-ratio t test, P = 0.05

EXAMPLE 4

This is another evaluation of the invention as a supplement added to the compost at spawning. However, unlike the previous examples, this cropping trial was conducted according to commercial-scale growing conditions at San Luis Rey Mushroom Farm. The rapeseed was treated as in Example 2.

The compost was prepared from a mixture of horse and chicken manures, cotton seed hulls, and cotton seed meal by standard practices. The compost was spawned with a commercial off-white hybrid strain of *A. bisporus* at the rate of 1 unit per 7 ft.$^2$ of production bed. With the exception of 120 ft.$^2$ area of the production bed, the compost was amended at spawning with Spawn Mate II SE at the rate of 7% (based upon 8 lbs. per ft.$^2$ dry weight of compost at spawning), the remaining 120 ft.$^2$ of production area was amended at spawning with 7% rapeseed calculated on a dry weight basis of the compost. After an 18 day spawn growth period at 25° C., the spawn-runned compost was cased with a 1.5 inch thick layer of a mixture containing peat, sugar beet waste, calcium carbonate, and shredded colonized compost to provide 1 lb. per 10 ft.$^2$ of production bed. Results of this Example are presented in Table IV below.

TABLE IV

| Treatment | Yield lbs./ft.$^2$ at | | | | |
|---|---|---|---|---|---|
| | Break 1 | Break 2 | Break 3 | Break 4 | Total |
| Rapeseed (7%) | 2.92 | 2.00 | 1.01 | 0.30 | 6.23 |
| Spawn Mate II SE (7%) | 3.11 | 1.88 | 0.99 | 0.25 | 6.23 |

Source of supplements: Same as Table 1.

During the spawn growth phase, the average temperature of the compost was 78° F. and 80° F. (25.6° C. and 26.7° C.) for the rapeseed and Spawn Mate II SE treatments, respectively. For each treatment, the peak of biological activity in the compost based on temperature occurred on day 13 of spawn run. Similarly, the average temperature of the compost during case hold was 79° F. and 78° F. (26.1° C. and 25.6° C.) for rapeseed supplement and Spawn Mate II SE, respectively.

After 4 breaks (28 days), yield of mushroom from the compost supplemented with either rapeseed or the commercial supplement Spawn Mate II SE was identical at 6.23 lbs./ft.$^2$. No differences in size and quality of the mushrooms existed between the treatments.

EXAMPLE 5

In this example, different methods of seed treatment were tested for their effect on sprouting and the delayed-release mechanism. The following seed treatments were used: no treatment ("Untreated"), 195° C. (90.5° C.) for 24 hours in an electric forced-air convection oven ("Standard"), 2.5 megarads of gamma irradiation ("Irradiated"), and autoclaved at 252° F. (121° C.) for 1.5 hours in plastic bags in a steam sterilizer ("Autoclaved").

It was found that untreated rapeseed had an 82% rate of germination (Table V). Treatments of either 195° F. for 24 hours, 2.5 megarads of gamma irradiation, or 252° F. for 1.5 hours, rendered the seed completely devoid of germination capability.

TABLE V

| Seed Treatment | Number of Seed Germinated/Number of Seed Tested | % Viability[b] |
|---|---|---|
| Untreated[a] | 41/50 | 82 |
| Standard[c] | 0/50 | 0 |
| Irradiated[d] | 0/50 | 0 |
| Autoclaved[e] | 0/50 | 0 |

[a]No treatment was used to discourage sprouting
[b]Number of seed germinated divided by number of seed tested × 100
[c]195° F. (90.5° C.) for 24 hours
[d]2.5 megarads of gamma irradiation
[e]252° F. (121° C.) for 1.5 hours The variously-treated rapeseed was evaluated as a delayed-release supplement in a mushroom production trial. The parameters for cropping were as described in Example 2 above. For all treatments, the compost was amended at spawning with 7% rapeseed (on a dry weight basis of the compost). During the 13-day spawn growth period, the temperature of the compost for each treatment was monitored at 6-hour intervals.

Figure 4:
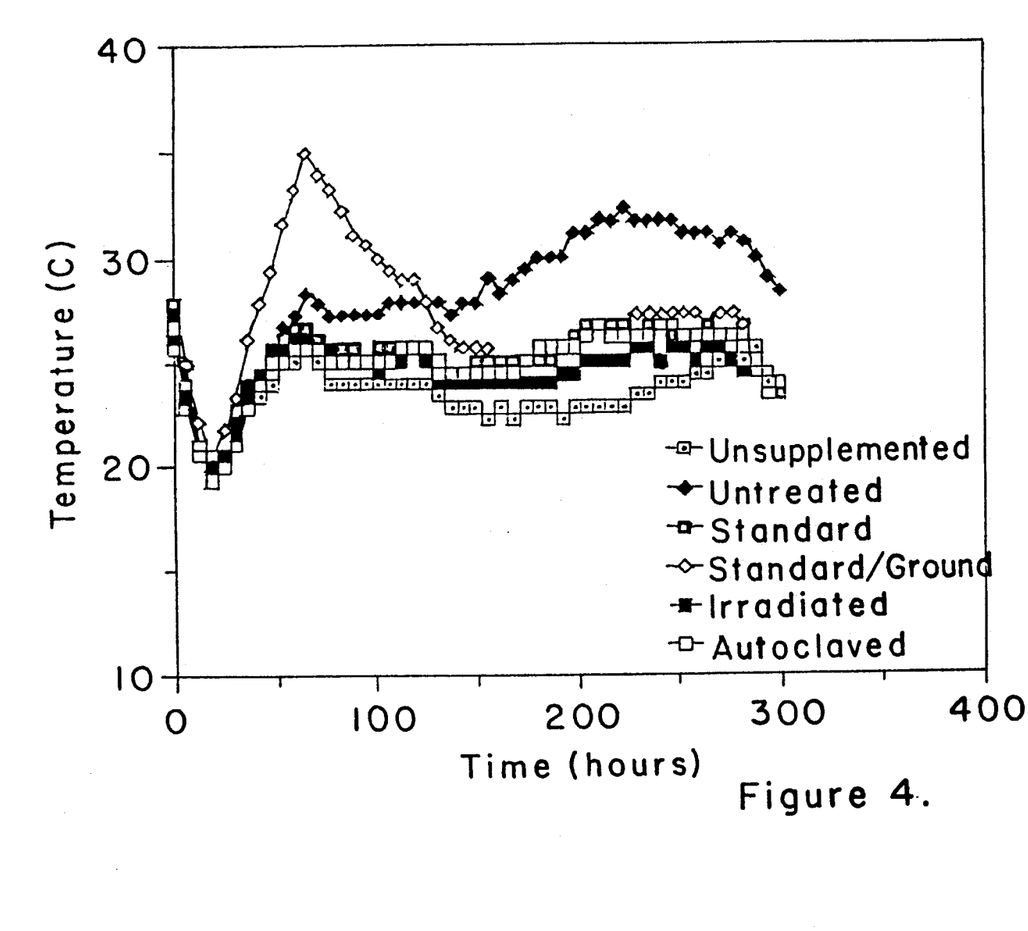

The temperature profiles of the compost during spawn run were similar for the standard-treated, gamma-irradiated, and autoclaved rapeseed, all indicating a slight evolution of heat compared to unsupplemented compost (FIG. 4). In contrast, seed treated in the standard fashion at 195° F. for 24 hours in an electric, forced-air convection oven, but then ground to a powder ("Standard/Ground"), produced a dramatic rise in the compost temperature on days 2 and 3. Untreated seed, which showed extensive sprouting during the spawn run period, created a gradual rise in the temperature of the compost. This latter increase was attributed to biological heat associated with the germination of the seed and growth of the seedling.

After four breaks, yields of mushroom from compost supplemented with rapeseed, which either had been heated in a forced-air convection oven, autoclaved, or gamma-irradiated, were similar (3.54 to 3.81 lbs./ft.$^2$) and markedly higher than unsupplemented compost (2.69 lbs./ft.$^2$) (Table VI). Untreated rapeseed, which sprouted, provided a less stimulatory effect on yield.

TABLE VI

| Treatment | Yield after Four Breaks (lbs./ft.$^2$)* |
|---|---|
| Unsupplemented | 2.69 d |
| Rapeseed-Untreated[a] | 3.17 c |
| Rapeseed-Standard[b] | 3.59 ab |
| Rapeseed-Irradiated[c] | 3.54 b |
| Rapeseed-Autoclaved[d] | 3.81 a |

[a]No treatment was used to discourage sprouting
[b]195° F. (90.5° C.) for 24 hours
[c]2.5 megarads of gamma irradiation
[d]252° F. (121° C.) for 1.5 hours
For each treatment, rapeseed was used at the rate of 7% on a dry weight basis of the compost.
Source of the rapeseed: Canola, Wilbur Ellis Co., Southwest Feed Division, Los Angeles, CA.
*Number followed by the same letter are not significantly different by the Waller-Duncan K-ratio t test, P = 0.05

Several conclusions can be drawn from this experiment. First, seed undergoing sprouting is a less effective supplement, most likely due to utilization for the nutrient reserve within the seed by the developing seedling, instead of the mushroom fungus. Second, both heat-based and nonheat-based (irradiation) methods for discouraging sprouting can be used to prepare seed as a delayed-release supplement for the cultivation of mushrooms. Thus, heating per se is not essential to the delayed-release mechanism, but only acts to kill the embryo or otherwise inhibit seed sprouting. Third, heated seed that was pulverized to destroy the integrity of the seed coat, caused an excessive evolution of heat in the compost. The nutrient within the seed was available to microorganisms in the compost, which was evidenced by extensive molding of the compost during the spawn growth period. Thus, an essentially intact seed coat is apparently essential in the delayed-release response of the invention.

Although the invention has been particularly described with respect to the prefered use of rapeseed or mixtures thereof as a nutrient supplement, other aspects of the invention include the possibility of using rapeseed in the production of mushrooms spawn. Spawn, cereal grain, colonized by fungal mycelium is used, to carry the fungus into the compost as a prerequisite to the formation of mushrooms. In accordance with a further aspect of this invention, rapeseed would be used as a substrate for the spawn, either solely or as an addition to the cereal grain. It is expected that this aspect of the invention will stimulate fungal colonization of the compost and thereby increase the yield of mushrooms.

What is claimed is:

1. In a method of cultivating mushrooms wherein a time delayed-release nutrient supplement is utilized, the improvement comprising utilizing an intact rapeseed having its sprouting capability irreversibly inhibited or destroyed and having inherent delayed-release properties as the supplement.

2. In the method of claim 1 wherein the rapeseed is subjected to a sprout inhibiting treatment to condition the rapeseed for later use as a supplement.

3. The method of claim 2 wherein the rapeseed is intact canola seed.

4. The method of claim 2 wherein the sprout inhibiting treatment is a heat treatment.

5. The method of claim 4 wherein the heat treatment is a dry heat processing at about 195° F. for about 24 hours.

6. The method of claim 4 wherein the heat treatment is autoclaving at about 252° F. for about 1.5 hours.

7. The method of claim 2, wherein the inhibiting treatment is selected from the group consisting of dry heating, autoclaving, gamma irradiation, UV irradiation, microwaving, ultrasound, micronizing, anti-sprouting chemical agents and genetic sterility.

8. The method of claim 1 wherein the supplement is used at spawning.

9. The method of claim 1 wherein the supplement is used at casing.

10. The method of claim 1 wherein the supplement is used during the mushroom production cycle.

11. The method of claim 1 wherein the supplement is used for *Agaricus bisporus* mushroom cultivation.

12. The method of claim 1 wherein the supplement is used for cultivation of mushroom species other than *Agaricus bisporus.*

13. The method of claim 1 wherein the supplement is used for increasing the rate of mycelial growth in a compost.

14. The method of claim 1 wherein the supplement is used to increase the rate of mycelial growth in a casing.

15. The method of claim 1 wherein the supplement is used to increase the yield of mushrooms.

16. The method of claim 12, wherein the mushroom species is selected from the group consisting of:
*Lentinula edodes,*
*Panoeolus venenosus,*
*Tremeila fuciformis,*
*Calvatia gigantea,*
*Flammulina velutipes,*
*Philota namelco,*
*Stropharia rugoso-annluata,* and
*Volvariela volvacea.*

17. The method of claim 12, wherein the mushroom species is selected from the group consisting of:
Agaricus spp.,
Auricularia spp.,
Boletus spp.,
Cantharellus spp.,
Pleurotus spp., and
Morchella spp.

* * * * *